United States Patent [19]

Horning et al.

[11] Patent Number: 5,162,948
[45] Date of Patent: Nov. 10, 1992

[54] ROLLING BALL ELEMENT MOUNT AND BARREL INTERFACE FOR ZOOMING

[75] Inventors: Randy E. Horning, Rochester; James C. Crosley, Spencerport, both of N.Y.

[73] Assignee: Eastman Kodak Company, Rochester, N.Y.

[21] Appl. No.: 806,057

[22] Filed: Dec. 11, 1991

[51] Int. Cl.$^5$ .............................................. G02B 15/00
[52] U.S. Cl. ..................................... 359/694; 359/825; 359/830; 362/277
[58] Field of Search ............... 359/819, 822, 823, 824, 359/825, 826, 827, 830, 694, 695, 703; 362/276, 277; 354/286

[56] References Cited

U.S. PATENT DOCUMENTS

| | | | |
|---|---|---|---|
| 2,500,050 | 3/1950 | Wittel | 359/830 |
| 4,439,011 | 3/1984 | Mackmerth | 359/825 |
| 4,601,539 | 7/1986 | Watanabe | 359/824 |
| 4,709,311 | 11/1987 | Bornhorst | 362/277 |
| 4,812,015 | 3/1989 | Iizuka et al. | 359/819 |
| 4,890,132 | 12/1989 | Hana | 359/823 |
| 5,078,472 | 1/1992 | Sugawara | 359/824 |

Primary Examiner—Loha Ben
Attorney, Agent, or Firm—David A. Hall

[57] ABSTRACT

A rolling ball element mount and barrel interface comprises a barrel and an element mount sharing a common lateral (X, Y, Z) and angular ($\Theta_X$, $\Theta_Y$, $\Theta_Z$) frame of reference located at a center of said barrel, the element mount adapted to fit inside the barrel axially along Z. A first component, including at least two rolling balls, is disposed between and adapted for contact with the element mount and the barrel for (i) constraining the element mount in lateral positions X and Y and angular positions $\Theta_X$ and $\Theta_Y$ and (ii) moveably coupling the element mount and the barrel in the axial direction. A second component, including at least one rolling ball, is disposed between and adapted for contact with the element mount and the barrel for (iii) constraining the element mount in angular position $\Theta_Z$ in cooperation with the first component and (iv) moveably coupling the element mount and the barrel in the axial direction. Lastly, a third component is selectively positioned between the element mount and barrel with respect to the first and second components for loading the element mount against the barrel to maintain the first and second components in contact with the element mount and the barrel, respectively, and for moveably coupling the element mount and the barrel in the axial direction.

21 Claims, 4 Drawing Sheets

ROLLING BALL ELEMENT MOUNT AND BARREL INTERFACE FOR ZOOMING

BACKGROUND OF THE INVENTION

1. Field of the Invention

The present invention relates to element mount and barrel interfaces and more particularly to a rolling ball element mount and barrel interface for camera zoom lenses.

2. Discussion of the Related Art

Camera zoom lenses typically comprise a lens subgroup or subgroups mounted within a lens barrel for axial displacement of the subgroup or subgroups during a zooming operation. The lens subgroup can comprise, for example, several lens elements mounted on an element mount. Sliding contacts, typically comprising protrusions extending outward on an outer surface of the element mount for contacting an inner surface of the lens barrel, are used to provide for axial motion in the element mount and barrel interface. The maximum axial distance between two sliding contacts of the element mount defines its wheelbase, which must be a minimum short distance for a maximum axial displacement of the element mount. A problem with the minimum fixed wheelbase is that the short wheelbase compromises tilt control of the element mount within the barrel. Compromised tilt control leads to jamming or lock-up of the element mount within the barrel during a zooming operation.

Yet another problem with sliding contact element mount and barrel interfaces is the requirement of more than one driving force for each element mount. In other words, a sliding contact element mount and barrel interface requires at least two driving pins, mounted on each element mount and protruding through corresponding slots in the barrel, for driving each element mount. Typically, a rotatable cam ring containing cam grooves is mounted on the lens barrel for urging the driving pins, thus moving the element mounts. The requirement of more than one driving force is due to the high coefficient of friction of the sliding contacts against the lens barrel. The combination of the small wheelbase and the high coefficient of friction places design limitations upon the location and magnitude of the applied driving forces necessary for zooming.

In U.S. Pat. No. 4,709,311, a lens carrier is shown which utilizes two stationary bearing assemblies circumferentially mounted about a lens element in a lens and barrel interface. The bearing assemblies comprise rings of resilient deformable ball bearings which are positioned between the cylindrical surfaces of the lens mount and the barrel. The lens carrier of the '311 patent suffers in that with the deformable balls, the coefficient of friction is not greatly reduced, similarly as in the case of the sliding contacts, thus a substantial force for moving the lens mount axially is required. The lens carrier further suffers in that the bearing assemblies would need to be spaced closely together to achieve a maximum axial displacement of the lens within the barrel, thus compromising tilt control. Furthermore, the element mount and barrel interface of the '311 patent does not restrain the lens element from rotating relative to the barrel. Preventing the lens mount from rotating is important in a zoom lens, since, when rotated, the centerlines of each lens element of a subgroup will wobble out of a nominal position as a result of non-uniform eccentricity in each lens element. Lens elements having uniform eccentricity are available; however, their extremely high cost makes their use in a low cost zoom camera prohibitive.

An element mount supported within a barrel is essentially a three dimensional object that lies in three dimensional space and therefore has six degrees of freedom, i.e., freedom of movement in lateral position (X, Y, Z) and in angular position ($\Theta_X$, $\Theta_Y$, and $\Theta_Z$). Since the position of the element mount in the axial direction is generally determined via a driving means, only five of these six degrees of freedom, namely, the lateral positions (X, Y) and the angular positions ($\Theta_X$, $\Theta_Y$, and $\Theta_Z$) need be considered in designing an element mount and barrel interface. An important point in properly interfacing the element mount within the barrel is to constrain its lateral (X, Y) and angular ($\Theta_X$, $\Theta_Y$, and $\Theta_Z$) positions using only a minimum number of constraints, that is, to exactly constrain the element mount in the desired degrees of freedom. The element mount should be exactly constrained (i.e., not under constrained nor over constrained) in its lateral (X, Y) and angular ($\Theta_X$, $\Theta_Y$, and $\Theta_Z$) positions.

A rigid body is exactly constrained in desired constrained degrees of freedom when the minimum required number of constraints against movement of the rigid body in the desired constrained degrees of freedom are used. A rigid body is under constrained in a desired constrained degree of freedom when there are insufficient constraints against motion in that desired constrained degree of freedom. Likewise, a rigid body is over constrained in a desired constrained degree of freedom when there are redundant constraints against motion in that desired constrained degree of freedom. Over constraining a desired constrained degree of freedom of a rigid body threatens the desired constraint of the rigid body in that degree of freedom since redundant constraints will compete with each other for providing the desired constraint against motion. In other words, redundant constraints make the constraint of the rigid body in that desired constrained degree of freedom unstable.

It would thus be desirable to provide an element mount and barrel interface that is simple, cost effective, and reliable. The element mount and barrel interface should allow for maximum axial displacement while minimizing the potential for jamming or tilting. Additionally, the element mount and barrel interface should exactly constrain the element mount within the barrel in all degrees of freedom except for the axial direction.

SUMMARY OF THE INVENTION

An object of the present invention is to overcome the problems in the related art as discussed above by providing a novel rolling ball element mount and barrel interface for zooming.

Thus in accordance with the invention, a rolling ball element mount and barrel interface comprises a barrel having a lateral (X, Y, Z) and angular ($\Theta_X$, $\Theta_Y\Theta_Z$) frame of reference located at a center of the barrel, the barrel further defining a predetermined center axis along Z. The interface further comprises an element mount, sharing a common frame of reference with the barrel and defining a predetermined center axis, adapted to fit inside the barrel axially along the Z axis. A first means, including at least two rolling balls, is disposed between and adapted for contact with the element mount and the barrel for (i) constraining the element mount in lateral positions X and Y and angular positions $\Theta_X$ and $\Theta_Y$ and (ii) moveably coupling the element mount and the barrel in the axial direction. A second means, including at least one rolling ball, is disposed between and adapted for contact with the element mount and the barrel for (iii) constraining the element mount in angular position $\Theta_Z$ in cooperation with the first means and (iv) moveably coupling the element mount and the barrel in the axial direction. A third means is selectively positioned between the element mount and the barrel with respect to the first and second means for loading the element mount against the barrel to maintain the first and second means in contact with the element mount and the barrel, respectively, and for moveably coupling the element mount and the barrel in the axial direction.

DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DESCRIPTION OF THE PREFERRED EMBODIMENT

Figure 1:
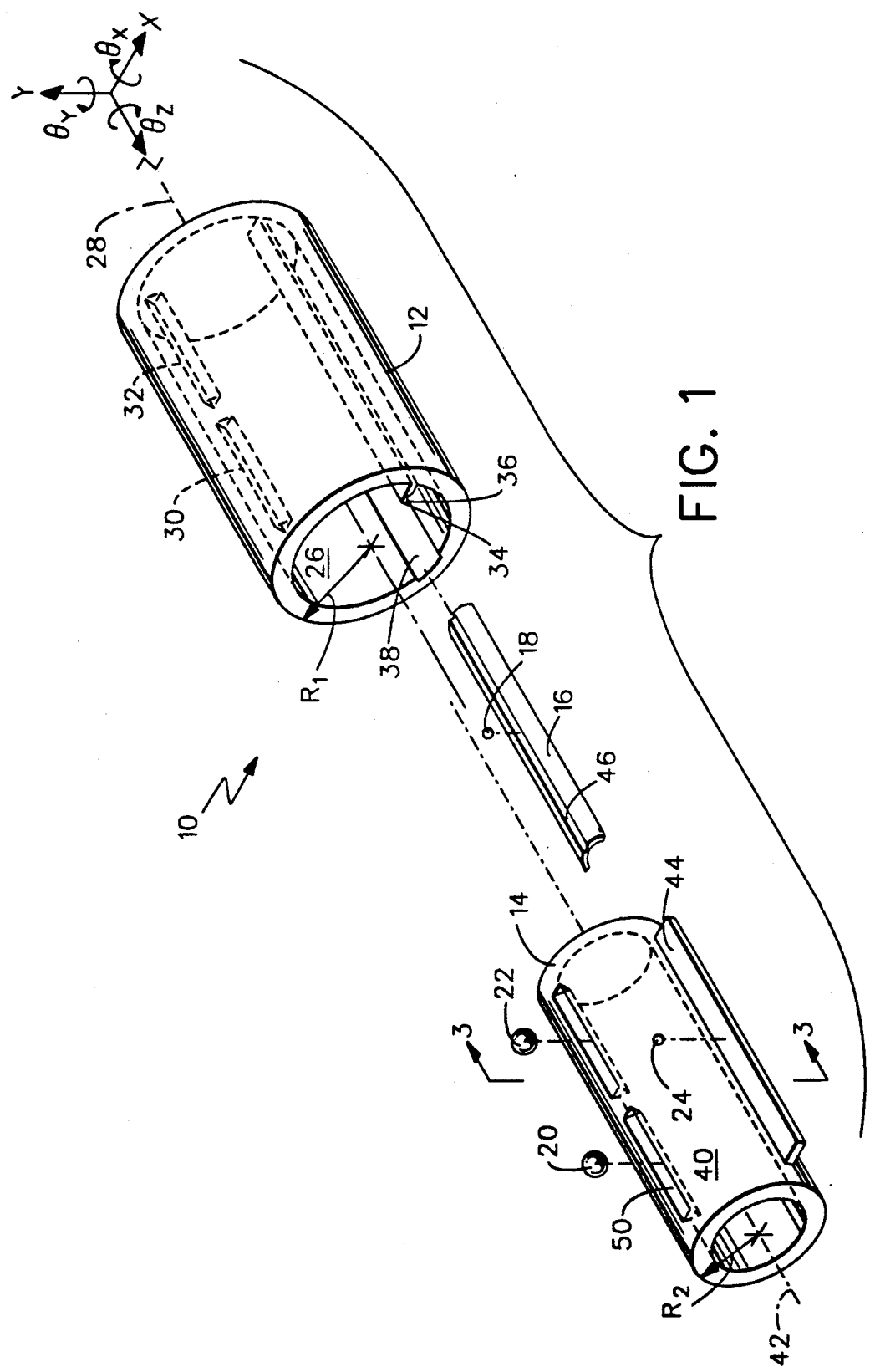
FIG. 1 is an exploded view of the rolling ball element mount and barrel interface according to the invention.

Referring now to FIG. 1, a rolling ball element mount and barrel interface 10 of the present invention comprises a barrel 12 and element mount 14. A functional requirement of interface 10 is to produce purely axial movement of the element mount 14 within the barrel 12. Purely axial movement of the element mount 14 is produced via an exact constraining configuration wherein all directions of motion are exactly constrained except for the axial direction Z. Purely axial motion of the element mount 14 within the barrel 12 prevents jamming and/or lock-up of the element mount within the barrel upon application of an external driving force provided by a driving means (not shown). The exact constraining configuration further minimizes internal stresses that are generated when the external driving force is applied to the element mount. The element mount and barrel interface 10 of the present invention is thus unsusceptible to deflection or bending of the element mount within the barrel as a result of the exact constraining configuration.

To accomplish the above, a combination of ball bearings, V-grooves, radial faces, and a loading force are utilized for exactly constraining the element mount in five degrees of freedom (X, Y, $\Theta_X$, $\Theta_Y$, and $\Theta_Z$) and moveably coupling the element mount 14 for movement in the sixth degree of freedom (Z). With respect to the sixth degree of freedom (Z) or axial direction, constraint is provided by the translational movement of the driving means (not shown) in the axial direction, wherein the translational movement provided by the driving means is presumed to be controlled and known for a particular zoom lens application. While the specific details of the driving means have not been shown herein, it should be understood that driving means for cameras lens and zoom lens are well known in the art and may take various forms known to persons of ordinary skill in the art. The following discussion is predicated by the element mount 14 and the barrel 12 each sharing the same frame of reference, (X, Y, Z, $\Theta_X$, $\Theta_Y$, $\Theta_Z$), located at the center of the barrel 12.

Referring again to FIG. 1, barrel 12 can comprise, for example, a cylindrical barrel having a generally cylindrical interior surface 26 defined about an axis 28 at a radius $R_1$. Two axially aligned notches or V-grooves, 30 and 32, are selectively positioned on the interior surface 26. Barrel 12 further includes a radial abutment or radial face 34 extending along the length of interior surface 26. Radial face 34 includes an axial notch or groove 36 selectively positioned therein in accordance with criteria to be described in detail hereafter. Groove 36 is coextensive with radial face 34. Barrel 12 still further includes an axial slot 38, extending along the length of interior surface 26 for securably receiving a sheet spring 16. While an axial slot 38 has been shown for securably receiving spring 16, any other suitable means may be employed for securing and locating spring 16 in its intended position. Sheet spring 16 provides a loading force, as will be explained below.

Referring now to FIGS. 1 and 2, element mount 14 can comprise, for example, a zoom lens subgroup having one or more lens elements 15 mounted therein. Element mount 14 can comprise a cylindrical element mount having a generally cylindrical exterior surface 40 defined about an axis 42 at a radius $R_2$. Radius $R_2$ is chosen to be less than radius $R_1$ of barrel 12 to allow element mount 14 to fit inside barrel 12 in the direction of their respective axes, 42 and 28.

Two axially aligned V-grooves or notches, 50 and 52, are selectively positioned on exterior surface 40 of element mount 14 for corresponding with grooves 30 and 32 of barrel 12, respectively, upon insertion of element mount 14 within barrel 12. V-grooves 50 and 52 are of sufficient width and depth so as to accommodate a portion of ball bearings 20 and 22, respectively, when the ball bearings are placed in the grooves. Grooves 50 and 52 are approximately the same length in the axial direction wherein their exact length and spacing in the axial direction are determined by the desired wheelbase and maximum axial displacement for a particular application (to be discussed later). As used herein, the term "wheelbase" refers to the distance between front and rear contact points in the element mount and barrel interface relative to length of the element mount or barrel, whichever is shorter. In the rolling ball element mount and barrel interface 10 of the present invention, the ball bearings 20 and 22 represent front and rear contact points for determining wheelbase, respectively. Whereas a short wheelbase provides compromised tilt control, the wheelbase provided by the predetermined positioning of ball bearings 20 and 22 in grooves 50 and 52, respectively, provides a lengthened wheelbase for improved tilt control.

It is to be noted that the dimensions of grooves 30 and 32 of barrel 12 are similar to the dimensions of grooves 50 and 52, respectively. Grooves 30 and 32 are of sufficient width and depth so as to accommodate a portion of ball bearings 20 and 22, respectively, when the ball bearings are placed in the grooves.

Element mount 14 further includes a radial abutment or radial face 44 extending along the length of exterior surface 40. Radial face 44 is selectively positioned to correspond with radial face 34 of barrel 12 when mount 14 is inserted inside barrel 12. Ball bearing 24 engages radial face 44 and groove 36 of radial face 34 when ball bearing 24 is placed between the two radial faces and the two radial faces are held proximate to one another.

Referring again to FIG. 1, sheet spring 16 can comprise any suitable material exhibiting a spring force characteristic when flexed cross-wise along its length. Spring 16 also includes a small notch or groove 46 on a top-side thereof, substantially centered and extending along the spring's length dimension. Notch 46 is of a suitable depth for receiving a portion of ball bearing 18. The spring force characteristic of sheet spring 16 is uniform along its length dimension and of sufficient force for maintaining element mount 14 within barrel 12 upon assembly and during use.

Figure 3:
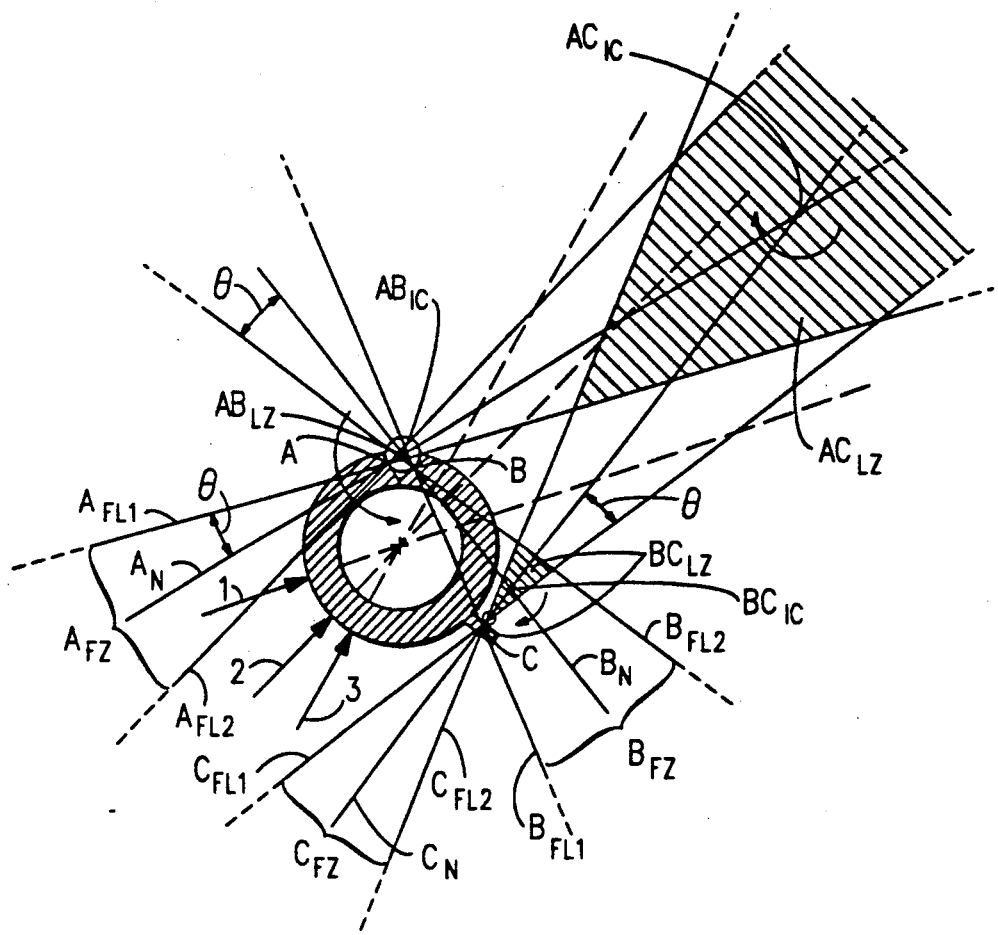
FIG. 3 is a cross-sectional view taken along line 3—3 showing the requirements for placement of constraints around the element mount.

The requirements for placement of the V-groove 50, bearings 20 and 24, radial face 44, and positioning of the loading force (provided by sheet spring 16, groove 46, and corresponding ball bearing 18) with respect to element mount 14 are shown in FIG. 3. The allowable angular relationship of the V-groove, bearings, radial face, and loading force is dependent on the coefficient of friction between the ball bearings 20 and 24 and the element mount 14. To determine this relationship, it is necessary to lay out the proposed positions as in FIG. 3. Starting with the proposed positions for A and B contact points (V-groove 50) and the C contact point (radial face 44), friction zones $A_{FZ}$, $B_{FZ}$, and $C_{FZ}$, respectively, are drawn from each of these points. The lines defining these friction zones are drawn at an angle of $\theta(\theta = \arctan(\mu)$, where $\mu$ is the coefficient of friction) on either side of the normal line to the contact surface such that the two friction lines and the normal line cross at the point of contact. For example, friction zone $A_{FZ}$ is defined by friction lines $A_{FL1}$ and $A_{FL2}$ drawn at an angle $\theta$ about normal line $A_N$ passing through contact point A. Friction zones $B_{FZ}$, and $C_{FZ}$ are similarly defined.

Positioning of the loading force (or loading force vector indicated by numeral 3 in FIG. 3), provided by ball bearing 18 in groove 46 of sheet spring 16, requires two conditions to be met. First, the force vector must not pass through the area of intersection of any two of the aforementioned friction zones. These areas of intersection are called lockup zones and are indicated by $AC_{LZ}$, $AB_{LZ}$, and $BC_{LZ}$ as shown in FIG. 3. The reason for this is that if any two points A, B, or C come in contact with their corresponding ball bearing, the loading force vector must be such that it will cause the element mount 14 to slide and contact the third point. The second requirement deals with moments about instant centers of rotation. These instant centers ($AC_{IC}$, $AB_{IC}$, and $BC_{IC}$) are defined by the intersection point of any two of the aforementioned normal lines passing through the contact points. For example, the instant center determined by the A and C contact points is called the AC instant center, $AC_{IC}$. It is the point about which the element mount 14 will rotate if only points A and C are in contact. The arrows shown in FIG. 3 around each instant center ($AC_{IC}$, $AB_{IC}$, and $BC_{IC}$) show the direction in which the element mount 14 must rotate in order to make the third point of contact. Thus, the second requirement on the positioning of the loading force is that the loading force vector must be directed such that the resulting moment around each instant center will be in the direction of these arrows.

To demonstrate, three proposed loading vectors 1, 2, and 3 are shown in FIG. 3. Vector 1 will not work because, even though it does not pass through any lockup zones $AC_{LZ}$, $AB_{LZ}$, or $BC_{LZ}$, it generates an incorrect moment about the AC instant center, $AC_{IC}$. Vector 2 is unacceptable because, even though it honors the moment requirements of each instant center $AC_{IC}$, $AB_{IC}$, and $BC_{IC}$, it passes through the AC lockup zone, $AC_{LZ}$. In other words (using vector 2), if A and C came into contact, the element mount 14 would not slide to contact point B. Vector 3 is an acceptable loading vector. With vector 3, all moment requirements are honored and no lockup zones are violated.

The spacing of axial grooves 50 and 52 along the axial direction Z is determined via the desired wheelbase for a particular application. In general, the wheelbase should be slightly longer than the required axial movement travel for the particular application, wherein the limits of axial movement are controlled by the driving means. This is to prevent the corresponding ball bearings from bottoming out in their respective grooves.

The positioning of the axial grooves 30, 32, 50, and 52, radial faces 34 and 44, and sheet spring 16 of interface 10 is thereby selected such that, upon assembly, element mount 14 is "exactly constrained and moveably coupled" within barrel 12. In other words, the above mentioned positioning is selected so that element mount 14 will be spring loaded inside barrel 12 via sheet spring 16 and the ball bearings 18, 20, 22, and 24 such that all possible directions of motion (i.e., degrees of freedom) are exactly constrained except for the direction of axial motion. In other words, element mount 14 is "exactly constrained" (i.e., not over-constrained nor under-constrained) within barrel 12 in all directions of motion except in the axial direction. Sheet spring 16 and ball bearings 18, 20, 22, and 24 exactly constrain and moveably couple element mount 14 to barrel 12 for enabling purely axial movement.

Figure 4:
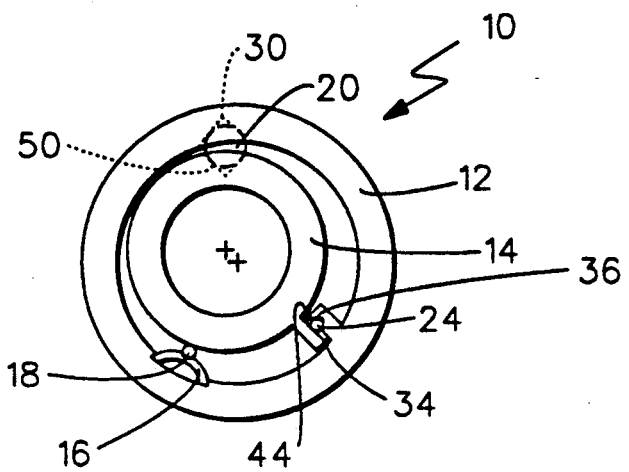
FIG. 4 is a frontal view of the rolling ball element mount and barrel interface according to the present invention.

Exactly constraining element mount 14, in the manner described above, also provides a "zero clearance" condition which guarantees that element mount 14 is rigidly located within barrel 12 in all directions of motion except the axial direction such that its movement is purely axial. The phrase "zero clearance," as used herein, refers to a condition in which no spacing or clearance exists between two objects at desired points of contact. Element mount 14 does not rotate during axial movement and the position of axis 42 of element mount 14 is tightly controlled during axial movement. Purely axial movement of element mount 14 also eliminates any wobble of the centerlines of lenses 15 out of their nominal positions. Wobble of the centerline of a lens occurs due to the non-uniform eccentricity in the lens as the lens is rotated. Exact constraint of element mount 14 within barrel 12 maintains axes 42 and 28 in parallel alignment during operation and use of interface 10. Furthermore, exactly constraining element mount 14 in the above described manner prevents jamming or tilting in the axial direction, since only purely axial movement of element mount 14 within barrel 12 is allowed. See FIGS. 1, 2, and 4.

Rolling ball element mount and barrel interface 10 can be manually assembled in the following manner. Sheet spring 16 is positioned and flexibly secured in slot 38 of barrel 38 along the length thereof, such that groove 46 faces inward. Next, ball bearings 20 and 22 are placed in grooves 50 and 52, respectively, of element mount 14. Element mount 14 is then inserted into barrel 12 along their respective axes, such that radial face 44 and radial face 34 are proximate one another. In addition, mount 14 is positioned inside barrel 12 so that ball bearings 20 and 22 are proximate grooves 30 and 32, respectively. Ball bearing 24 is then positioned in groove 36 via pressure contact between radial face 34 and radial face 44. By suitably positioning element mount 14 within barrel 12, temporary pressure contact is provided for holding ball bearings 20, 22, and 24 in place while assembling interface 10. Ball bearing 18 is then inserted in groove 46 of sheet spring 16 for providing the necessary loading force for maintaining the other ball bearings in pressure contact with their respective grooves.

Figure 2A:
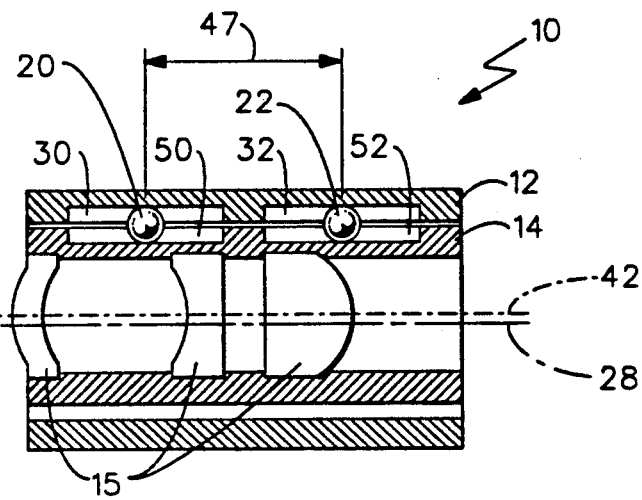
FIGS. 2a, 2b and 2c are cross-sectional side views of the rolling ball element mount and barrel interface.
Figure 2B:
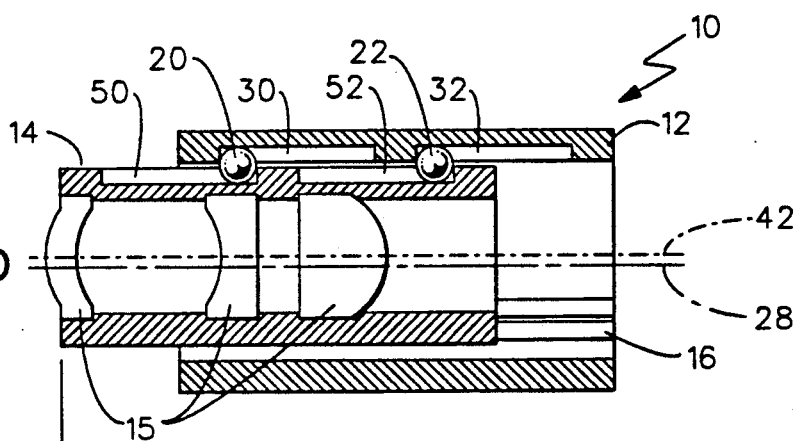
Figure 2C:
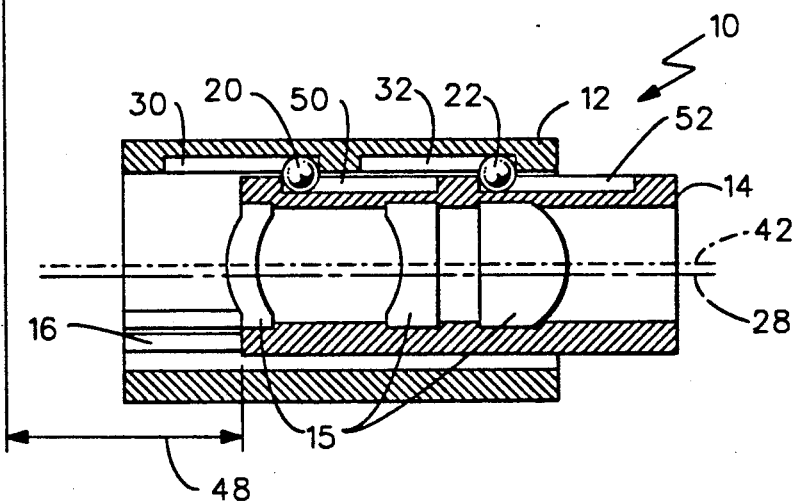

During assembly of interface 10, the positioning of the ball bearings within their respective grooves is adjusted to achieve desired neutral positioning, such as that shown in FIG. 2a. Using a small diameter dowel, or other suitable instrument, ball bearings 18 and 24 are forcibly pushed along their respective grooves so as to end up mid-way along the length dimension of element mount 14 (or barrel 12). Element mount 14 is then forcibly moved to each extended extreme position as shown in FIGS. 2b and 2c for positioning ball bearings 20 and 22 similarly in their respective grooves. By forcibly moving element mount 14, ball bearings 20 and 22 are forced into their desired positions according to the length dimensions of grooves 50 and 52 or grooves 30 and 32, whichever are shorter. Interface 10 thus allows for simple assembly and adjustment of the ball bearing positioning. Interface 10 may also be assembled automatically by any suitable technique known in the art.

Positioning of ball bearings 20 and 22 mid-way in grooves 50 and 52, respectively, defines the wheelbase 47 of element mount and barrel interface 10. For the given wheelbase 47, a maximum displacement (indicated by arrow 48 in FIG. 2) of element mount 14 within barrel 12 is obtainable. Wheelbase 47 provides greater stability and improved tilt control over that of a sliding contact element mount and barrel interface which would require a shorter wheelbase for obtaining the same axial displacement 48.

With reference to the constraint features of interface 10, element mount 14 is connected to barrel 12 through first and second ball bearings, 20 and 22, respectively, which nest in corresponding grooves of element mount 14 and barrel 12. This provides constraint to the element mount in X, Y, $\Theta_X$, and $\Theta_Y$. The element mount is connected to the barrel via a third ball bearing 24 which locates against radial face 44 of element mount 14 and nests in V-shaped groove 36 of barrel 12. This provides constraint to the element mount 14 in $\Theta_Z$. A fourth ball bearing 18 nests in groove 46 of sheet spring 16 for providing a compliant loading force against element mount 14 to keep the constraint features of the element mount and barrel interface 10 in contact. The fourth ball bearing 18 in combination with sheet spring 16 do not constrain the element mount within the barrel, i.e., they do not dictate the position of the element mount within the barrel. Rather, ball bearing 18 and sheet spring 16 provide the compliant loading force as described above and also enable movement of the element mount in the axial direction. Element mount 14 is therefore exactly constrained within barrel 12 in five degrees of freedom (X, Y, $\Theta_X$, $\Theta_Y$, and $\Theta_Z$) provided by the constraining features of the ball bearings, V-grooves, and radial faces. Recall that this discussion has been predicated upon the fact that element mount 14 and barrel 12 each share the same frame of reference which is located at the center of the barrel.

A review of the constraints on element mount 14 in each of the desired constrained five degrees of freedom (X, Y, $\Theta_X$, $\Theta_Y$, and $\Theta_Z$) shows that the five degrees of freedom are neither under constrained nor over constrained. They are exactly constrained. Accordingly, element mount 14 is exactly constrained within barrel 12 in the desired constrained five degrees of freedom and moveably coupled for axial movement. This results in purely axial movement of element mount 14 within barrel 12 upon application of the external axial driving force, since only axial motion is allowed.

In operation, a driving pin (not shown) or other such means is suitably attached to element mount 14 thru a corresponding elongated slot (not shown) in barrel 12. The length of the elongated slot can define the desired zoom lens travel limit for a particular zoom application. As previously discussed, the desired zoom lens travel limit is recommended to be less than the maximum travel limit of element mount 14 within barrel 12, designated by numeral 48 in FIG. 2. This is to prevent ball bearings 20 and 22 from bottoming out (i.e., being driven to the extreme ends of their respective grooves) during operation. Under normal zooming operation of interface 10, bottoming out is not preferred since doing so could place undue stress upon the ball bearings and their respective grooves should element mount 14 be forced beyond its extreme axial positions within barrel 12.

Element mount 14 can be driven by any known means via the driving pin for positioning element mount 14 within barrel 12. When moved from the neutral position shown in FIG. 2a to a forwardly extended position, similar to the position shown in FIG. 2b, ball bearings 18, 20, 22, and 24, roll within their respective grooves. The parallel alignment of axes 42 and 28 is maintained due to the exact constraining and moveably coupling configuration. Rolling of the ball bearings within their respective grooves further provides a low coefficient of friction, thus requiring a minimal driving force to position element mount 14 within barrel 12. In other words, the sheet spring 16 and ball bearings 18, 20, 22, and 24 in their corresponding grooves provides a near-frictionless interface for enabling near-frictionless axial movement of element mount 14 within barrel 12. In addition, the low coefficient of friction minimizes the generation of internal stresses upon the element mount 14 within the barrel 12 as the element mount 14 is driven to desired axial positions. The low coefficient of friction also allows greater design flexibility in the placement or location of the driving pin on the element mount 14. As a result, the design and use of interface 10 is kept simple. Likewise, when moved from the neutral position shown in FIG. 2a to a rearwardly extended position, similar to the position shown in FIG. 2c, ball bearings 18, 20, 22, and 24 roll in their respective grooves.

In addition to providing a low rolling coefficient of friction, the ball bearings prevent element mount 14 from rotating within barrel 12. No additional means are required to prevent rotation of element mount 14 within barrel 12. This is desirable in a low cost zoom lens application since low cost lenses having non-uniform eccentric properties may be used without concern for wobble of the lens centerlines.

Figure 5:
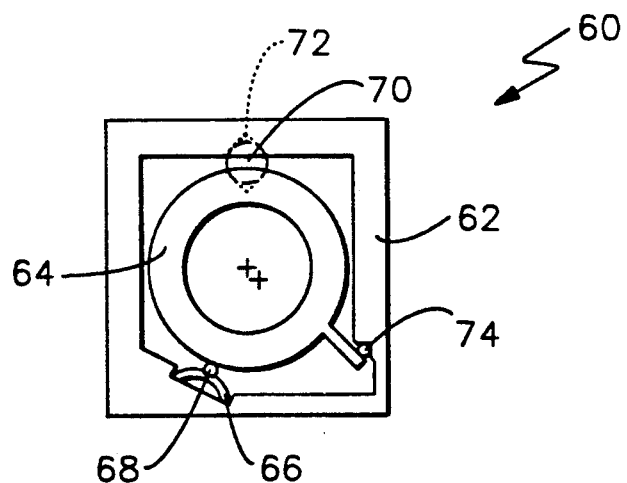
FIG. 5 is a frontal view of the rolling ball element and barrel interface according to an alternate embodiment of the invention.

In an alternate embodiment of the present invention, element mount and barrel interface 60 is similar to the preferred embodiment with the exception that barrel 62 is a non-cylindrical barrel (See FIG. 5). Element mount 64 is exactly constrained and moveably coupled within barrel 62 for movement in the axial direction only. Sheet spring 66 provides a radial loading spring force along a length dimension of barrel 62 for maintaining ball bearings 68, 70, 72, and 74 in corresponding grooves. Assembly and operation of element mount and barrel interface 60 is similar to that of the preferred embodiment.

Accordingly, it has been shown that the barrel 12, element mount 14, sheet spring 16, and ball bearings 18, 20, 22, and 24 provide a simple, cost effective, and reliable element mount and barrel interface 10. In addition, the interface 10 minimizes any potential for jamming or tilting of the element mount 14 within barrel 12 during use.

While the invention has been described with reference to the preferred and alternate embodiments, it will be appreciated that variations and modifications can be affected within the spirit and scope of the invention. For example, grooves 30 and 32 could be combined into a single axial groove while grooves 50 and 52 remain as previously described, or vice versa.

What is claimed is:

1. A rolling ball element mount and barrel interface, comprising:
   (a) a barrel having a lateral (X, Y, Z) and angular ($\Theta X$, $\Theta_Y$, $\Theta_Z$) frame of reference located at a center of said barrel, said barrel further defining a predetermined center axis along Z;
   (b) an element mount defining a predetermined center axis and adapted to fit inside said barrel axially along the Z axis, said element mount sharing a common frame of reference with said barrel;
   (c) a first means, including at least two rolling balls disposed between and adapted for contact with said element mount and said barrel, for (i) constraining said element mount in lateral positions X and Y and angular positions $\Theta_X$ and $\Theta_Y$ and (ii) moveably coupling said element mount and said barrel in the axial direction;
   (d) a second means, including at least one rolling ball disposed between and adapted for contact with said element mount and said barrel, for (iii) constraining said element mount in angular position $\Theta_Z$ in cooperation with said first means and (iv) moveably coupling said element mount and said barrel in the axial direction; and
   (e) third means selectively positioned between said element mount and said barrel with respect to said first means and said second means for loading said element mount against said barrel to maintain said first means and said second means in contact with said element mount and said barrel, said loading means further moveably coupling said element mount and said barrel in the axial direction.

2. The interface of claim 1, wherein said first means, said second means, and said third means maintain parallel alignment of the respective center axes of said element mount and said barrel.

3. The interface of claim 1, wherein said first means, second means, and said loading means enable near-frictionless axial movement of said element mount within said barrel.

4. The interface of claim 1, wherein said barrel is a cylindrical barrel.

5. The interface of claim 1, wherein said barrel is a non-cylindrical barrel.

6. The interface of claim 1, wherein:
   (a) said barrel further having first and second axially aligned slots selectively positioned therein on an inner surface thereof and having a radial face selectively positioned on the inner surface thereof, the radial face having a coextensive axial slot positioned therein;
   (b) said element mount having first and second axially aligned slots selectively positioned on an exterior surface thereof for corresponding with the first and second axially aligned slots of said barrel, said element mount further having a radial face selectively positioned on an exterior surface thereof for corresponding with the radial face of said barrel;
   (c) said first means comprises two ball bearings, one ball bearing to be received in each of the first and second axially aligned slots of said element mount, said ball bearings further to be received in and contact with the corresponding first and second axially aligned slots of said barrel, respectively;
   (d) said second means comprises a ball bearing to be received in the coextensive radial face axial slot of said barrel and contact with the radial face of said element mount; and
   (e) said third means comprises a resilient sheet spring and a ball bearing, said sheet spring having a groove on a top side thereof facing said element mount, the groove being substantially centered and coextensive therewith, and said ball bearing to be received in the groove of said sheet spring for contact with said element mount.

7. The interface of claim 6., wherein said first means, said second means, and said third means maintain parallel alignment of the respective center axes of said element mount and said barrel.

8. The interface of claim 6, wherein said first means, second means, and said loading means enable near-frictionless axial movement of said element mount within said barrel.

9. The interface of claim 6, wherein said barrel is a cylindrical barrel.

10. The interface of claim 6, wherein said barrel is a non-cylindrical barrel.

11. The interface of claim 1, wherein:
   (a) said barrel further having a first axial slot selectively positioned therein on an inner surface thereof and having a radial face selectively positioned on the inner surface thereof, the radial face having a coextensive axial slot positioned therein;
   (b) said element mount having two axially aligned slots selectively positioned on an exterior surface thereof for corresponding with the first axial slot of said barrel, said element mount further having a radial face selectively positioned on an exterior surface thereof for corresponding with the radial face of said barrel;
   (c) said first means comprises two ball bearings, one ball bearing to be received in each axially aligned slot of the two axially aligned slots of said element mount, said ball bearings further to be received in and contact with the corresponding first axial slot of said barrel;

(d) said second means comprises a ball bearing to be received in the coextensive radial face axial slot of said barrel and contact with the radial face of said element mount; and (e) said third means comprises a resilient sheet spring and a ball bearing, said sheet spring having a groove on a top side thereof facing said element mount, the groove being substantially centered and coextensive therewith, and said ball bearing to be received in the groove of said sheet spring for contact with said element mount.

12. A rolling ball element mount and barrel interface, comprising:

(a) a barrel having a lateral (X, Y, Z) and angular ($\Theta_X$, $\Theta_Y$, $\Theta_Z$) frame of reference located at a center of said barrel, said barrel further defining a predetermined center axis along Z;

(b) an element mount defining a predetermined center axis and adapted to fit inside said barrel axially along the Z axis, said element mount sharing a common frame of reference as said barrel;

(c) a first means, including at least two rolling balls disposed between said element mount and said barrel, for providing (i) constraint of said element mount in lateral positions X and Y and angular positions $\Theta_X$ and $\Theta_Y$ and (ii) a moveable couple between said element mount and said barrel in the axial direction, the constraint and moveable couple features being provided upon contact of said first means with said element mount and said barrel;

(d) a second means, including at least one rolling ball disposed between said element mount and said barrel, for providing (iii) constraint of said element mount in angular position $\Theta_Z$ *in cooperation with said first means and (iv) a moveable couple between said element mount and said barrel in the axial direction, the constraint and moveable couple features being provided upon contact of said first means and said second means with said element mount and said barrel;* and (e) third means selectively positioned between said element mount and said barrel with respect to said first means and said second means for loading said element mount against said barrel to maintain said first means and said second means in contact with said element mount and said barrel, said third means further moveably coupling said element mount and said barrel in the axial direction.

13. The interface of claim 12, wherein said first means, said second means, and said third means maintain parallel alignment of the respective center axes of said element mount and said barrel.

14. The interface of claim 12, wherein said first means, second means, and said loading means enable near-frictionless axial movement of said element mount within said barrel.

15. The interface of claim 12, wherein said barrel is a cylindrical barrel.

16. The interface of claim 12, wherein said barrel is a non-cylindrical barrel.

17. The interface of claim 12, wherein:

(a) said barrel further having a first axial slot selectively positioned therein on an inner surface thereof and having a radial face selectively positioned on the inner surface thereof, the radial face having a coextensive axial slot positioned therein;

(b) said element mount having two axially aligned slots selectively positioned on an exterior surface thereof for corresponding with the first axial slot of said barrel, said element mount further having a radial face selectively positioned on an exterior surface thereof for corresponding with the radial face of said barrel;

(c) said first means comprises two ball bearings, one ball bearing to be received in each axially aligned slot of the two axially aligned slots of said element mount, said ball bearings further to be received in and contact with the corresponding first axial slot of said barrel;

(d) said second means comprises a ball bearing to be received in the second axial slot of said barrel and contact with the radial face of said element mount; and (e) said third means comprises a resilient sheet spring and a ball bearing, said sheet spring having a groove on a top side thereof facing said element mount, the groove being substantially centered and coextensive therewith, and said ball bearing to be received in the groove of said sheet spring for contact with said element mount.

18. The interface of claim 17, wherein said first means, said second means, and said third means maintain parallel alignment of the respective center axes of said element mount and said barrel.

19. The interface of claim 17, wherein said first means, second means, and said loading means enable near-frictionless axial movement of said element mount within said barrel.

20. The interface of claim 17, wherein said barrel is a cylindrical barrel.

21. The interface of claim 17, wherein said barrel is a non-cylindrical barrel.

* * * * *